(12) United States Patent
Cote et al.

(10) Patent No.: US 6,449,877 B1
(45) Date of Patent: Sep. 17, 2002

(54) AIR DRYER FOR USE IN A VEHICLE WASH SYSTEM

(75) Inventors: Dennis R. Cote, West Linn; Daniel C. Hanna, Jr., Lake Oswego; Wayne E. Carlson, Oregon City; Ira William Wills, Scappoose, all of OR (US)

(73) Assignee: Hanna Car Wash Systems International, LLC, Portland, OR (US)

( * ) Notice: Subject to any disclaimer, the term of this patent is extended or adjusted under 35 U.S.C. 154(b) by 0 days.

(21) Appl. No.: 09/548,503

(22) Filed: Apr. 13, 2000

Related U.S. Application Data

(63) Continuation-in-part of application No. 29/103,601, filed on Apr. 13, 1999, now abandoned.
(60) Provisional application No. 60/129,109, filed on Apr. 13, 1999.

(51) Int. Cl.[7] .................................................. F26B 19/00
(52) U.S. Cl. .......................... 34/666; 15/312.1; 251/305
(58) Field of Search ................................. 251/298, 305; 34/666; 137/340; 15/312.1, 326, 419; 392/380

(56) References Cited

U.S. PATENT DOCUMENTS

| | | | |
|---|---|---|---|
| 3,642,024 A | * 2/1972 | La Coste et al. | 137/340 |
| 3,991,433 A | * 11/1976 | Cirino | 15/312 R |
| 4,469,305 A | * 9/1984 | Baumann | 251/305 |
| 4,836,467 A | * 6/1989 | Rodgers | 15/316 R |
| 5,876,015 A | * 3/1999 | Schaeffer et al. | 251/305 |

* cited by examiner

*Primary Examiner*—Denise L. Esquivel
*Assistant Examiner*—Greg T. Warder
(74) *Attorney, Agent, or Firm*—Chernoff, Vilhauer, McClung & Stenzel, LLP

(57) ABSTRACT

An airflow control system of the present invention is positionable between an air producer and a duct exit. The airflow restricter includes an outer airflow restricter ring that has a central diameter. A pivot rod is rotatably positioned along the central diameter. An aerodynamic rotatable airfoil is secured about the pivot rod. The present invention also includes an airflow transition between the air producer having a first-shaped air producer exit and the duct having a second-shaped duct entrance.

6 Claims, 4 Drawing Sheets

AIR DRYER FOR USE IN A VEHICLE WASH SYSTEM

"This application claims the benefit of priority of provisional patent application No. 60/129,109, filed Apr. 13, 1999, and is a continuation of patent application Ser. No. 29/103,601, filed Apr. 13, 1999, now abandoned."

BACKGROUND OF THE INVENTION

The present invention is directed to an airflow control system and particularly to an airflow control system that reduces turbulence.

There are many industrial applications that require a variable rate of airflow through a duct. One application of an airflow control system is a dryer in a vehicle wash system or car wash.

In a car wash, there are often dryers positioned at various locations along the vehicles path of travel. These dryers blow water off the vehicles, thereby substantially drying the vehicles. In such applications, a certain velocity of air is required to blow water off the vehicle surfaces. The air is typically provided by an air producer, blower, or air dryer. The air is then directed to the desired location by a duct having a duct exit or exhaust from which high velocity air exits. The velocity of the air decreases rapidly after it exits the duct. Therefore, the velocity of the air at the point it exits the duct is necessarily faster than the velocity required to blow the water off the surface of the cars.

If all vehicles had surfaces of the same height, the velocity of the air exiting the duct could be set to a predetermined rate, such that by the time the air reached the vehicle surface, it would have slowed to the proper speed. Most car washes, however, allow vehicles of greatly differing heights to enter the facility. If the exit velocity of the air from the duct is great enough to blow water off a low profile car, the same exit velocity of air could damage a high profile vehicle such as a van or a truck passing beneath the duct exit. Therefore, the airflow must be adjusted to correspond to the height of the surface from which the water is to be blown. Because the height of the blower is typically fixed a certain distance above the ground, to achieve a desired velocity of air at the surface of the vehicle, the exit velocity of air from the duct must be varied.

There are also other reasons that it would be advantageous to be able to adjust airflow. For example, since the soft-top of a convertible is easily damaged by maximum airflow, being able to reduce airflow would prevent the soft-top from being damaged. Another example is that being able to decrease airflow between vehicles would reduce power consumption of the system.

One way of providing an adjustable airflow has been to include a flat plate in the duct that can be rotated relative to the airflow to cause more or less of a blockage in the duct, thereby reducing or increasing the amount of airflow through the duct. The most open position would be when the major surface of the plate is parallel to the airflow and the most closed position would be when the major surface of the plate is perpendicular to the airflow. In the open position, the high speed of the airflow around the flat plate still causes significant turbulence, which decreases the efficiency of the system and increases the noise of the system. It is undesirable to have a decrease in efficiency and an increase in noise.

The transition between the air producer and the duct has also been problematic in that it tends to create turbulence. Generally the air exit of the air producer is smaller than the air entrance to the duct. Also, the air producer exit generally has a rectangular or square cross-section whereas the duct entrance generally has a round cross section. In an attempt to reduce turbulence, known systems have used a smooth gradation from the air producer exit to duct entrance. This smooth transition, however, has not been shown to significantly reduce or eliminate the turbulence.

Because older systems have inefficient airflow control systems, it would be desirable to be able to retrofit dryers in existing car washes with adjustable airflow control systems that neither reduce the efficiency of the system nor significantly increase the noise of the system.

Traditionally most car wash equipment, including dryers, has been installed using overhead arches. Although the arches allow for cabling and wiring to be easily run over the top of the car wash, the arches present a somewhat cluttered appearance and obstruct the view into the car wash. This is significant because it is important in the car wash industry that the machinery looks as clean and open as possible so as to attract customers to the car wash.

One difficulty with installation of traditional dryers in a car wash is determining where to position the duct exit or outlet of the air dryers relative to the vehicles to achieve optimal drying. When arches are used, the positioning of the air dryers becomes constrained by the position of the arch itself. Accordingly, there is a need for a modular air dryer system in which the duct exits can be located in any position relative to the vehicles passing through the vehicle wash system. Such a new positioning system would provide the car wash operator with increased flexibility in selecting the design configuration of the dryers, thereby increasing the efficiency of the dryers and making dryer installation easier and less expensive.

BRIEF SUMMARY OF THE INVENTION

The invention claimed herein is directed to the inventions disclosed in U.S. Provisional Patent Application No. 60/129,109 and U.S. Design Patent Application No. 29/103,601, the subject matter of which is incorporated herein by reference.

An airflow control system of the present invention is positionable between an air producer and a duct exit. The airflow restricter includes an outer airflow restricter ring that has a central diameter. A pivot rod is rotatably positioned along the central diameter and an aerodynamic rotatable airfoil is secured about the pivot rod. Preferably, the system has an open position in which the airfoil being parallel to airflow and a closed position in which the airfoil being perpendicular to airflow. An actuator is optionally operatively connected to the pivot rod to permit rotation of the airfoil to be remotely actuated.

One preferred embodiment of the present invention may include an airflow transition between the air producer having a first-shaped air producer exit and the duct having a second-shaped duct entrance. The airflow restricter ring is positioned and secured between the air producer flange and the duct flange.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
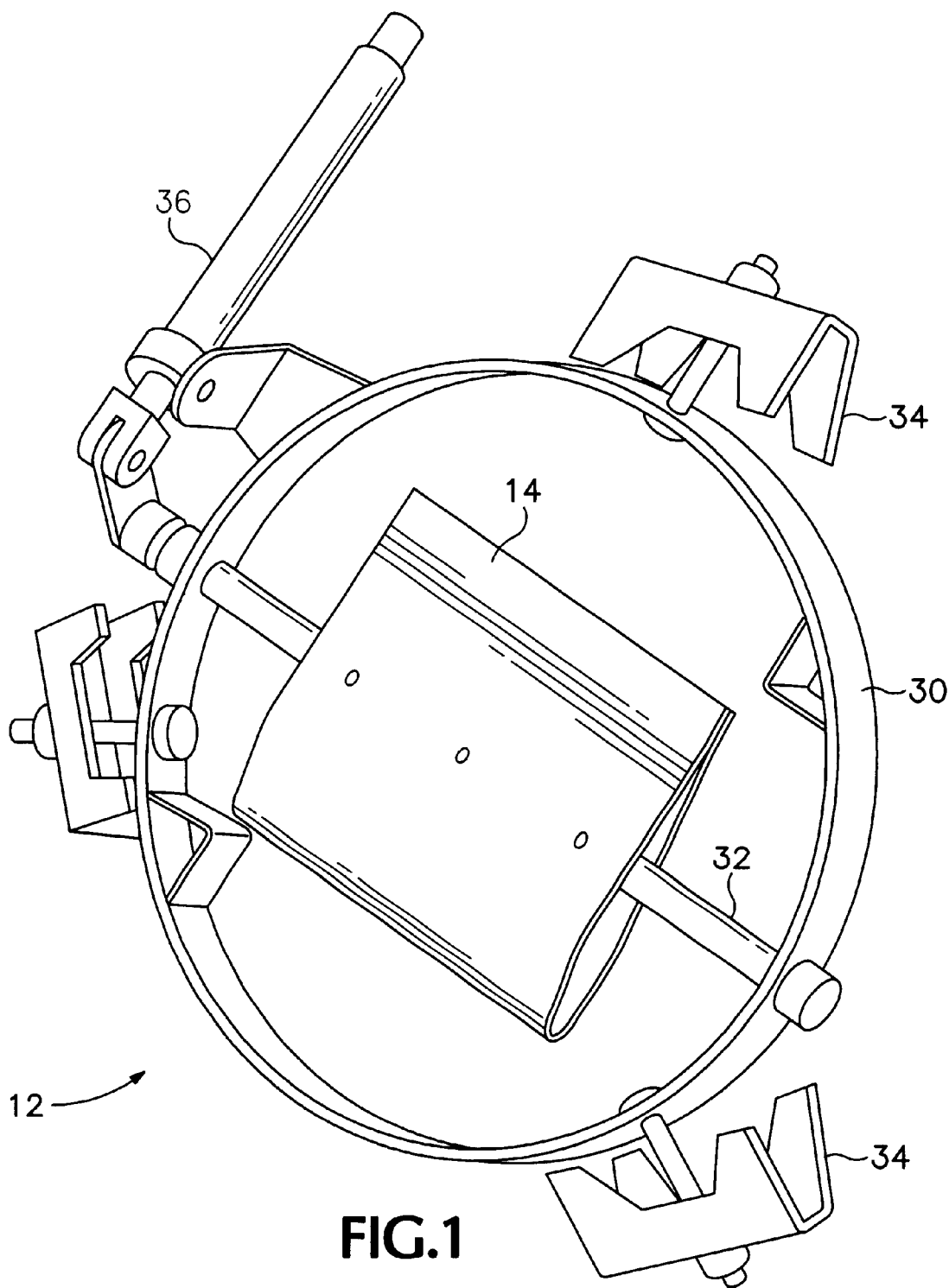
FIG. 1 is a perspective view of an air restricter assembly having a rotatable airfoil of the present invention.

The present invention is an airflow control system 10 for use in industrial applications such as a car wash. In one preferred embodiment, the airflow control system 10 has a novel airflow restricter 12 or damper (FIGS. 1–3) with a rotatable airfoil 14 (FIGS. 1–4). The airflow restricter 12 is typically positioned between an air producer 16 such as a blower or air dryer and a duct 18 or tube assembly. A separate preferred embodiment of the airflow control system 10 includes a novel transition 20 (FIGS. 5–7) between an air exit 22 of the air producer 16 and an air entrance 24 of the duct 18.

Figure 2:
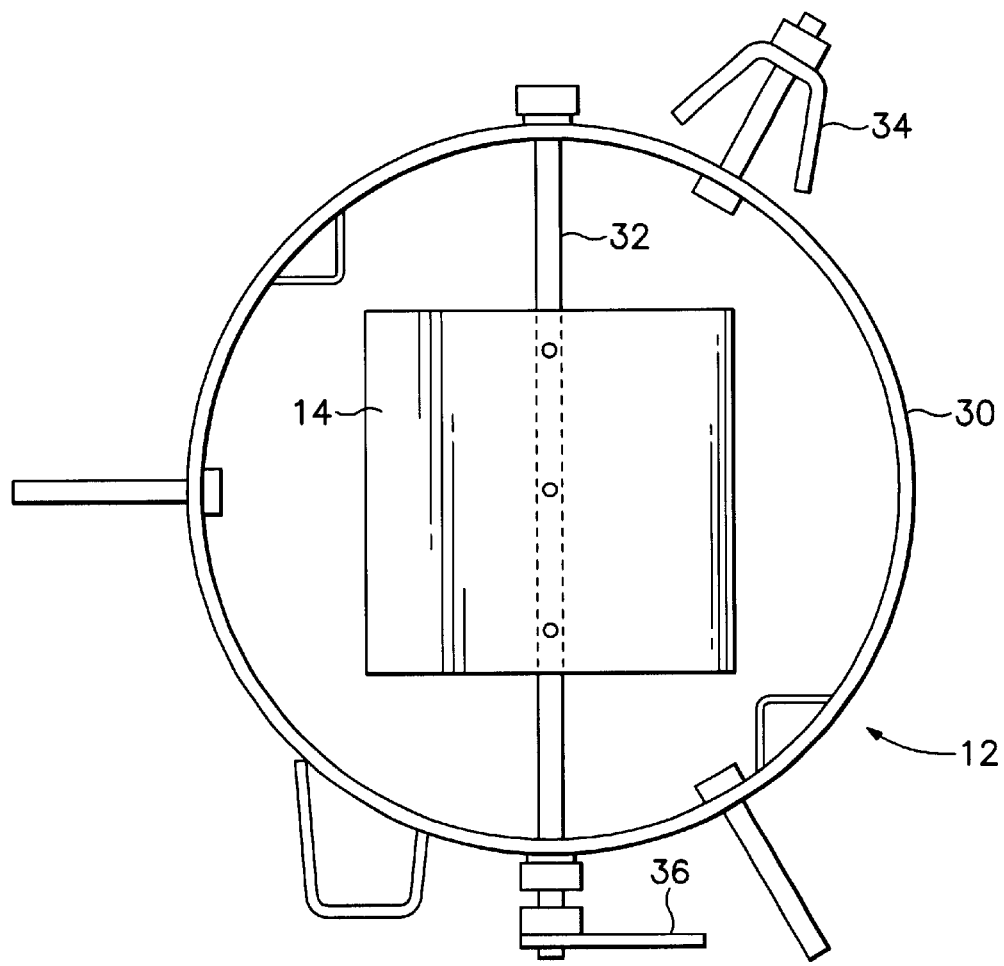
FIG. 2 is a plan view of a preferred embodiment of the air restricter assembly of the present invention.
Figure 3:
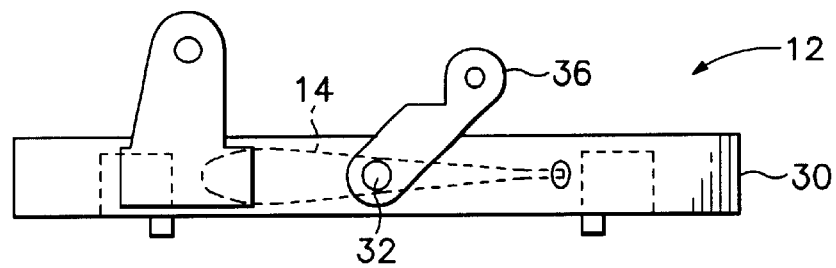
FIG. 3 is a side view of a preferred embodiment of the air restricter assembly of the present invention.
Figure 4:
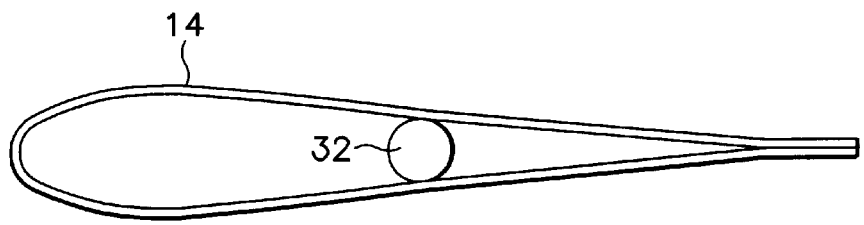
FIG. 4 is a side view of a preferred embodiment of the rotatable airfoil of the present invention.

One preferred embodiment of the airflow restricter 12, as shown in FIGS. 1–3, has an external ring 30 with a pivot rod 32 positioned along a central diameter. The rotatable airfoil 12 is secured about the pivot rod 32 so that it is substantially centered within the ring 30. Optionally at least one fixturer 34 or clamp may be used to attach and secure the ring 30 in position between the air producer exit 22 and the duct entrance 24. Also optionally, an actuator 36 may be connected to the pivot rod 32 to permit rotation of the airfoil 14 to be actuated from a remote location.

When the rotatable airfoil 14 is rotated such that its surface is perpendicular to the airflow, the airfoil 14 acts as a flat plate, thereby blocking at least a portion of the airflow and reducing the rate of airflow through the duct 18. In one preferred embodiment about eighty percent of the airflow is blocked. The airfoil 14 can be sized and positioned to block any percentage of airflow in the closed position. When the airfoil 14 is rotated 90-degrees so that it is parallel to the airflow, its aerodynamic design allows air to flow around the airfoil 14 without creating turbulence, significantly decreasing the efficiency of the system, or increasing the noise caused by turbulence in the system. In fact, there is no measurable difference between the airflow in a system using the aerodynamic airfoil design and a system using no airfoil.

In one preferred embodiment, rotation of the airfoil 14 is achieved through use of a solenoid-activated cylinder actuator 36 that can be infinitely adjusted to rotate the airfoil 14 between a perpendicular closed position and a parallel open position. In this way, the amount of airflow can be precisely adjusted to accommodate vehicles of any height as they pass beneath the duct exit. In fact, the airflow rate on a single vehicle could be varied to accommodate varying heights of surfaces on a vehicle such as a truck with a cab having a first height and a bed having a second height. Such adjustments can be made automatically using a sensor system. This can be done using an optical sensor to sense the height of a vehicle surface directly beneath the duct exit. A signal is then sent to the actuator 36 to effect a rotation of the airfoil 14, thereby adjusting the airflow through the duct. The actuator 36 may be an air cylinder, mechanical solenoid, rotary screw, manual lever, or any other type of actuator or combination of actuators.

FIGS. 1–4 show one preferred embodiment of the airflow restricter 12 and its rotatable airfoil 14. From these drawings, it will be clear to one of ordinary skill in the art how to produce such assemblies. The shape of the ring 30, the type of fixturer 34, and the type of actuator 36, could be varied to make the airflow restricter 12 suitable for different sized and shaped air producer exits 22 and duct entrances 24. The rotatable airfoil 14 also could be constructed using a single, bent sheet of metal as shown or it could be made as a solid unit. Further, although the shown airfoil has a substantially square surface, the length and width could be adjusted to accommodate different sizes of air producer exits 22 and duct entrances 24. Still further, the airfoil could have a circular surface. In some of these alternate airfoil embodiments a solid airfoil would be preferable to the shown embodiment.

Figure 5:
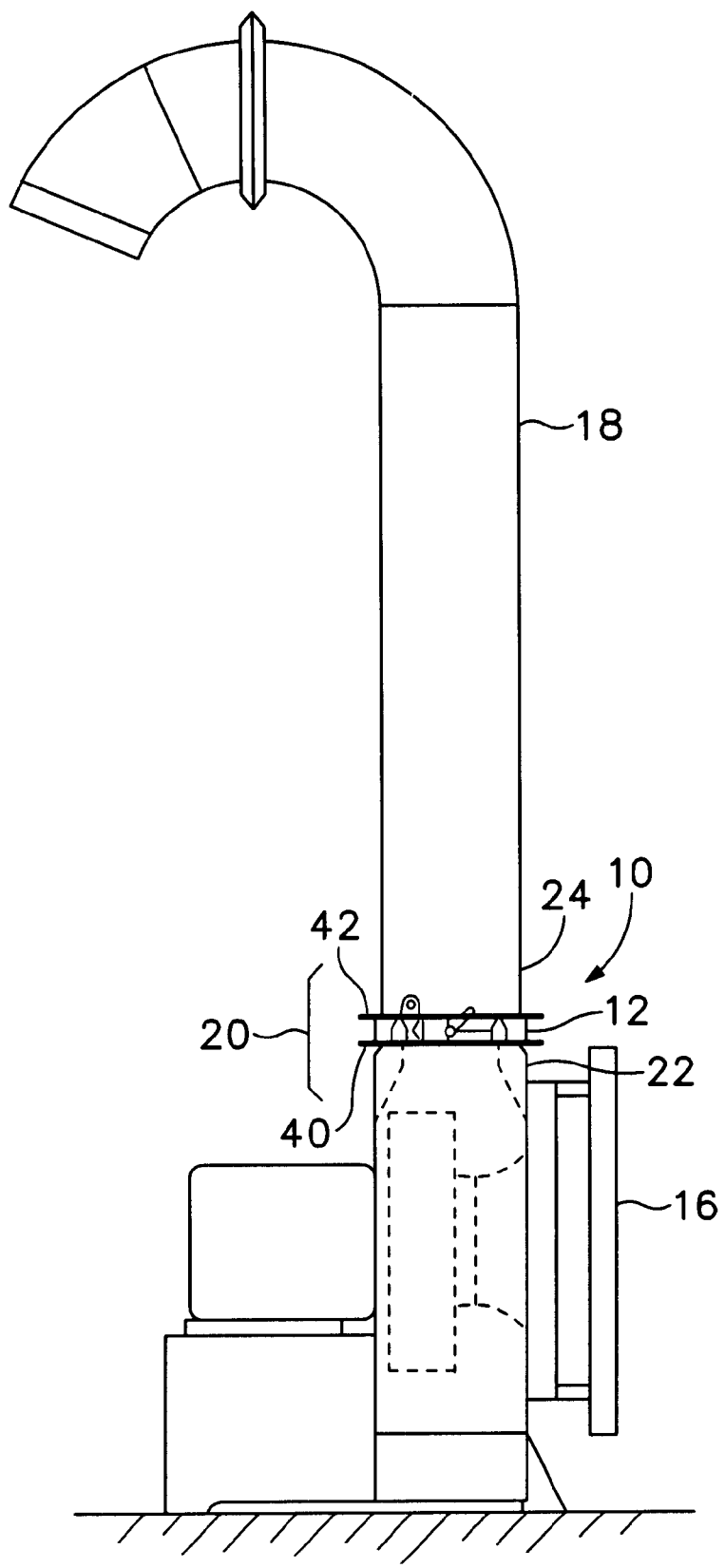
FIG. 5 is a back plan view of a first embodiment of an automobile air dryer having a transition of the present invention between a square/rectangular outlet of an air producer and a circular inlet of an air duct.
Figure 6:
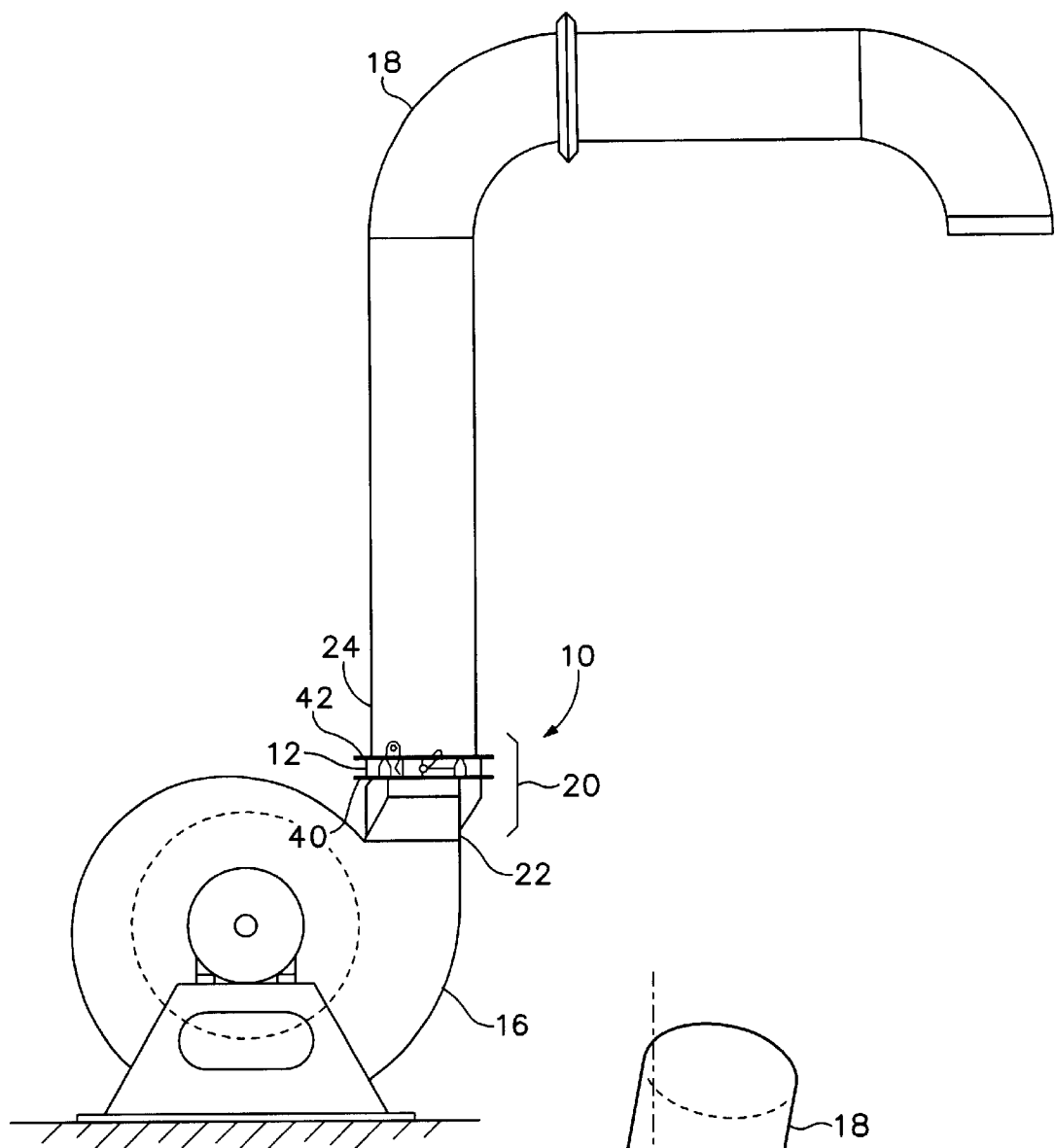
FIG. 6 is a side plan view of a second embodiment of an automobile air dryer having a transition of the present invention between a square/rectangular outlet of an air producer and a circular inlet of an air duct.
Figure 7:
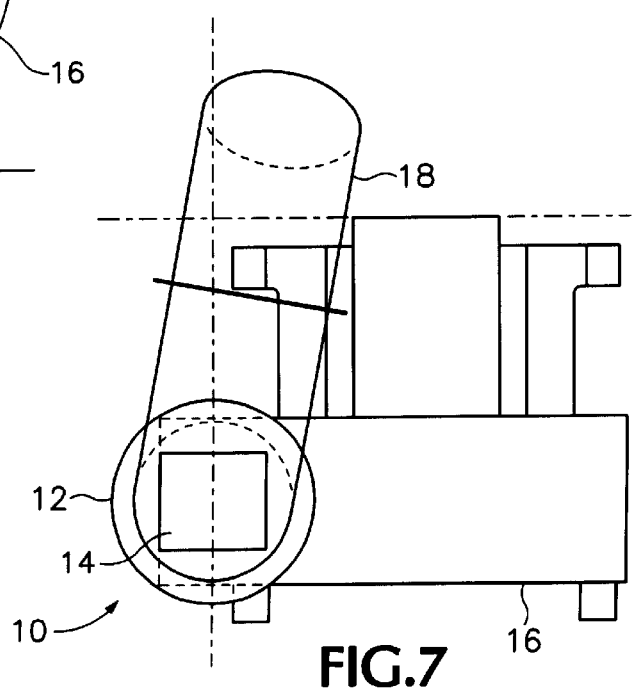
FIG. 7 is a top plan view of a third embodiment of an automobile air dryer having a transition of the present invention between a square/rectangular outlet of an air producer and a circular inlet of an air duct.

FIGS. 5–7 show exemplary dryers, each dryer having a transition 20 between the air producer 16 and the duct 18. Specifically, the air producer 16 has a first-shaped air producer exit 22 and the duct 18 has a second-shaped duct entrance 24. Preferably the duct entrance 24 is larger than the air producer exit 22. The air producer exit 22 has an air producer flange 40 having a common-shaped outer perimeter and a first-shaped cutout corresponding to the air producer exit 22. The duct entrance 24 has a duct flange 42 having a common-shaped outer perimeter and a second-shaped cutout corresponding to the duct entrance 24. An airflow restricter ring 30 is positioned and secured between the air producer flange 40 and the duct flange 42.

In one preferred embodiment the first-shaped air producer exit is substantially square in cross-section and the second-shaped duct entrance is substantially circular in cross-section. This square-to-round transition embodiment of the present invention is significantly cheaper to make than a traditional gradual square-to-round transition. This embodiment also reduces the length of duct 18 necessary for the transition. There is also a noticeable decrease in temperature and noise due to the reduction of turbulence. Using the transition 20 of the present invention reduces production costs, reduces installation time, and provides a more efficient blower.

It should be noted that the airflow restricter 12 does not need to be directly related to, or connected with a transition 20. The airflow restricter 12 may be located adjacent any pipe joint. It may also be installed in other, non-joint positions by cutting the duct 18 and inserting the assembly between the two cut portions.

The duct 18 can be shaped and configured such that the duct exit can be at any longitudinal, lateral, or vertical location relative to the path of travel of the vehicle through the vehicle system. In the preferred embodiment, the ducts 18 are manufactured from a structural material such as stainless steel that has sufficient strength to support its weight without the need of any support structure. In the preferred embodiment the ducts 18 are eight inches in diameter.

To alter the vertical location of the duct exit, additional length of duct 18 can be added to the duct assembly, thereby increasing its overall height. Furthermore, the duct 18 may be bent or bends may be placed in the duct to alter the profile of the duct 18 and to affect the duct exit location. In a typical configuration, to direct air onto the top horizontal surfaces of vehicles, a relatively tall duct 18 is used with two 90-degree bends that direct the airflow onto the top of the vehicle. To direct airflow onto the side of a vehicle, a relatively short duct 18 is used with only a single 90-degree bend thereby directing the air horizontally toward the vertical surface of a car. The ducts 18 may further be rotated where they connect with the blower, thereby altering the longitudinal position, and to a lesser extent the lateral position of the exit location of the duct 18. In this way, the location of the duct exit is infinitely adjustable.

Because the ducts 18 are cylindrical and free standing, they present a very clean smooth appearance. This design allows for easy cleaning of the exterior of the ducts 18 and helps to avoid the buildup of dust and dirt on overhanging surfaces. This design also allows for maximum visibility into the vehicle wash facility, thereby increasing its appeal to customers. Finally, the cost of freestanding duct assemblies is typically cheaper than the cost of arches supporting dryer assemblies.

The terms and expressions that have been employed in the foregoing specification are used as terms of description and not of limitation, and are not intended to exclude equivalents of the features shown and described or portions of them. The scope of the invention is defined and limited only by the claims that follow.

What is claimed is:

1. An airflow control system for use in drying vehicles in a vehicle wash system, comprising:
    (a) a blower for blowing drying air and a duct in fluid communication with said blower for directing said drying air at said vehicles;
    (b) an airflow restricter ring disposed between said blower and said duct;
    (c) a pivot rod rotatably mounted to said restricter ring; and
    (d) an aerodynamic rotatable airfoil secured to said pivot rod, said airfoil having a leading edge that is thicker than a tapered trailing edge.

2. The system of claim 1 wherein said system has an open position and a closed position, said airfoil being parallel to airflow in said open position and said airfoil being perpendicular to airflow in said closed position.

3. The system of claim 1 further comprising an actuator operatively connected to said pivot rod to permit rotation of said airfoil to be actuated from a remote location.

4. An airflow system for use in drying vehicles in a vehicle wash system, comprising.
    (a) an air producer for blowing dying air and a duct in fluid communication with said air producer for directing said drying air at said vehicles;
    (b) said air producer having a first-shaped air producer exit;
    (c) said duct having a second-shaped entrance, said second-shaped entrance being shaped differently than said first-shaped exit;
    (d) said second-shaped entrance being larger than said first-shaped exit; and
    (e) a rotatable member for controlling the speed of said drying air, wherein said rotatable member is an airfoil having a thick leading edge and a tapered trailing edge.

5. The air flow system of claim 4 further comprising a resticter ring between said air producer and said duct.

6. The air flow system of claim 4 wherein said duct is cylindrical.

\* \* \* \* \*

UNITED STATES PATENT AND TRADEMARK OFFICE
CERTIFICATE OF CORRECTION

PATENT NO.   : 6,449,877 B1
DATED        : September 17, 2002
INVENTOR(S)  : Dennis R. Cote It is certified that error appears in the above-identified patent and that said Letters Patent is hereby corrected as shown below:

<u>Column 1,</u>
Line 18, change "Vehicles path" to -- Vehicle's path --.

<u>Column 6,</u>
Line 16, delete the period "." after "comprising" and insert a colon -- : -- so that it reads "comprising:".
Line 17, change "dying" to -- drying --.

Signed and Sealed this

Tenth Day of February, 2004

JON W. DUDAS
*Acting Director of the United States Patent and Trademark Office*